United States Patent [19]

Smitley

[11] 3,994,357
[45] Nov. 30, 1976

[54] SAFETY SHUT-OFF FUEL SYSTEM
[75] Inventor: Marion L. Smitley, Birmingham, Mich.
[73] Assignee: Colt Industries Operating Corporation, New York, N.Y.
[22] Filed: June 6, 1975
[21] Appl. No.: 584,651

[52] U.S. Cl. .............................. 180/82 R; 137/494; 180/103 BF
[51] Int. Cl.² .......................................... B60K 15/08
[58] Field of Search ................. 180/82 R, 103, 104; 123/198 D, 198 DB; 137/38, 39, 494, 495, 469; 417/295, 506, 507, 559

[56] References Cited
UNITED STATES PATENTS

| 1,262,013 | 4/1918 | Callon | 123/198 DB |
| 1,461,662 | 7/1923 | Kawamura | 123/198 DB |
| 2,212,486 | 8/1940 | Zoder | 123/198 DB |
| 3,001,773 | 9/1961 | Johnson | 417/507 |
| 3,148,671 | 9/1964 | Bottorff | 123/198 DB |
| 3,620,198 | 11/1971 | Breitschwerdt | 137/39 X |
| 3,810,489 | 5/1974 | MacManus | 137/495 |

Primary Examiner—M. H. Wood, Jr.
Assistant Examiner—Terrance L. Siemens

[57] ABSTRACT

An automotive fuel system which has a fuel tank, a fuel pump, a fuel metering device for metering fuel flow to an associated fuel-consuming engine, and a fuel reservoir (such as, for example, a carburetor fuel bowl), has a valving assembly interposed generally between the outlet of the fuel pump and the fuel reservoir with such assembly being responsive to, for example, the associated vehicle experiencing a crash impact or a roll-over condition whereupon such valving assembly becomes effective to prevent the further flow of fuel from the fuel pump into the fuel reservoir.

8 Claims, 2 Drawing Figures

SAFETY SHUT-OFF FUEL SYSTEM

BACKGROUND OF THE INVENTION

Generally, automotive vehicles, whether automobiles, trucks, buses or the like, have a relatively high degree of stability even in situations where they are struck from the side by another vehicle at a relatively velocity. The stability and resistance to such struck vehicle turning over is due to such factors as the relatively heavy weight of the vehicle, its relatively low center of gravity as well as the relatively wide lateral wheel spacing. However, a very small percentage of such automotive vehicles involved in crashes do, nevertheless, turn or roll over or otherwise severly change their attitude from what would be considered normal.

It has been for many years, accepted practice to, in automotive vehicles, provide fuel tank from where a fuel pump would draw fuel and in turn supply such fuel to, for example, a fuel metering device on a remotely situated engine.

Often times such fuel metering devices take the form of a carburetor with an associated fuel bowl including a float-valve assembly therein. In many such arrangements there is a vent passage which, in effect, serves to complete communication as between the interior of the fuel bowl (above the fuel contained therein) and a source of ambient atmosphere as, for example, some point or area within and downstream of the engine intake air cleaner.

Of the very small percentage of such automotive vehicles which do turn over, roll over or otherwise severely change their attitude it has been found that a further small percentage thereof have had fuel spill out of the vent tube or passage (or other passages communicating with the engine intake system) and flow over the engine and associated structure. In such instances, after investigations, it has been determined that because of the particular physical attitude or position assumed by the struck vehicle the fuel tank may actually assume an elevation above that of the carburetor fuel bowl. Because of such a change in relative elevations the liquid pressure head of the fuel within the fuel tank becomes sufficient to cause fuel to flow through the fuel (even though the fuel pump may not be operating) and into the carburetor fuel bowl from where such fuel, as previously indicated, can spill over onto the engine and associated structure. Such spilled fuel can, in turn, under circumstances giving rise to such a condition, ignite with the resulting flames being capable of starting the entire vehicle to burn.

Even though the occurrence of such crash situations leading to such fuel-caused fires is rare, nevertheless, the invention as herein disclosed and described is directed to the solution of such as well as other attendant and related problems.

SUMMARY OF THE INVENTION

According to the invention, an automotive fuel system comprising a fuel tank, a fuel pump for pumping fuel from the tank to an associated fuel metering device which in turn meters fuel to an associated engine, has valving means effective for automatically preventing further fuel flow from the fuel tank and fuel pump to the associated fuel metering device upon the associated vehicle sustaining, for example, a crash impact or a severe change in its attitude as, for example, a rolling over.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and elements may be omitted from one or more views.

DETAILED DESCRIPTION OF THE PREFERRED EMBODIMENT

Figure 1:
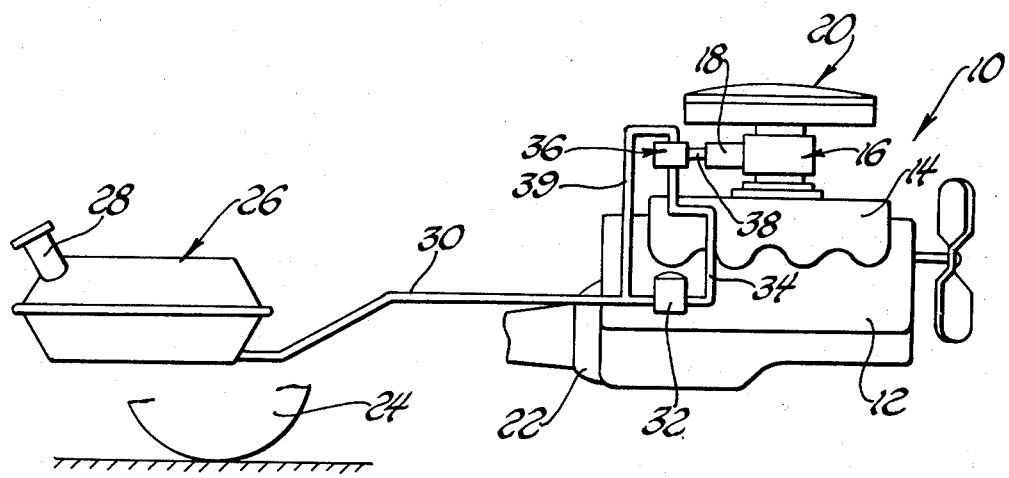
FIG. 1 is a side elevational view depicting the general arrangement of an automobile fuel system employing the teachings of the invention and associated fuel consuming engine.

Referring now in greater detail to the drawings, FIG. 1 illustrates an automotive engine 10 as being comprised of an engine block or housing 12 with an intake manifold 14 and a fuel metering device 16 situated generally thereatop.

For purposes of discussion, the fuel metering device 16 may be considered to be a carburetor with an associated fuel reservoir or fuel bowl assembly 18 associated therewith. An air cleaner assembly 20 serves to filter the ambient air being supplied to the intake of the carburetor 16.

A power output transmission assembly 22 may be employed for providing power to the vehicular ground-engaging drive wheels such as fragmentarily illustrated at 24.

A fuel tank assembly 26, usually remotely situated with respect to the engine 10, is provided with a fuel filler pipe or tube 28 and has fuel supply conduit means 30 leading from the tank assembly 26 to the inlet or intake of a related fuel pump assembly 32. The fuel pump assembly 32 may be of any type (many of which are very well known in the art) and may be driven electrically or mechanically as by a direct mechanical connection with the engine assembly 10.

The outlet or discharge of the fuel pump assembly 32 has conduit means 34 leading from there to the inlet of a valve assembly 36 which, in turn, has its outlet connected to conduit means 38 leading to the inlet of the fuel bowl assembly 18. Additional conduit means 39 is provided as to communicate generally between valve assembly 36 and conduit means 30.

Generally, during normal operation, fuel supplied by tank assembly 26 is drawn in by pump assembly 32 from where it is pumped into and through valve assembly 36 and into fuel bowl assembly 18 which may, in turn, employ float actuated and controlled inlet valving means for assuring the admission of only that quantity of pumped fuel as is necessary to maintain a preselected desired level of fuel within such fuel bowl for desired metering characteristics and performance. It should also be mentioned that even though pump assembly 32 is illustrated as being externally of tank assembly 26, such pump assembly, as is also generally well known in the art, may in fact be located internally of the tank assembly 26.

Figure 2:
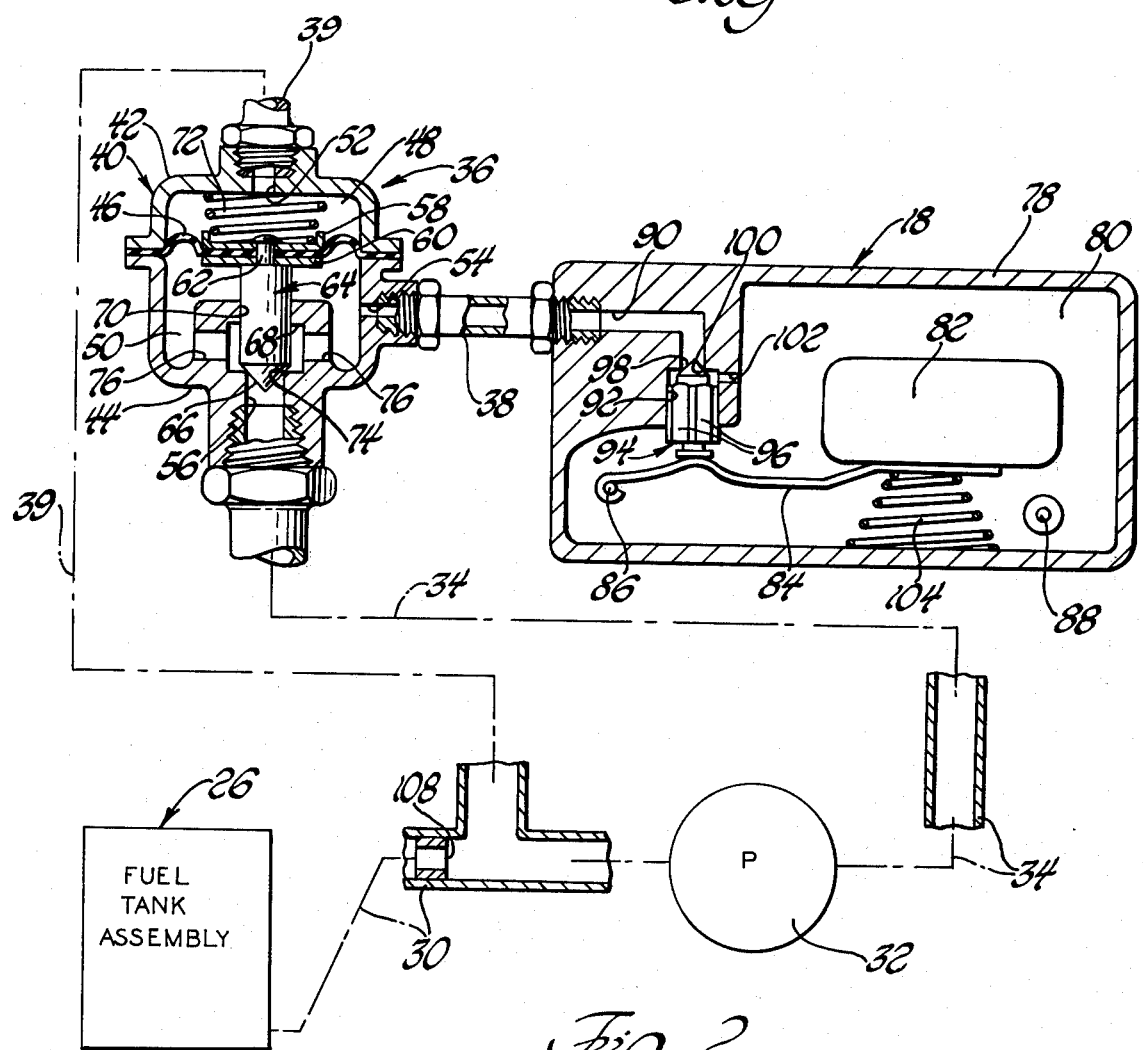
FIG. 2 is a generally axial cross-sectional view, in enlarged scale, of the valve assembly depicted in elevation in FIG. 1, and cooperating fuel reservoir or fuel bowl assembly, along with schematically and diagrammatically illustrated attendant circuitry and elements.

Referring to FIG. 2, the valving assembly 36 is illustrated as comprising a housing or body 40 having first and second housing sections 42 and 44 which are suitably secured to each other in a manner as to generally peripherally contain and retain therebetween a diaphragm or movable wall member 46 which, in turn, generally defines at opposite sides thereof first and second distinct but variable chambers 48 and 50. As shown, chamber 48 is placed in communication with conduit means 39 as by porting or conduit means 52 formed in housing section 42 while chamber 50 is adapted for communication with conduit means 38, as by conduit or passage portion 54, and adapted for at times communicating with conduit means 34 as by conduit or passage portion 56.

Diaphragm backing plates or members 58 and 60 are suitably secured at opposite sides of diaphragm 46 and operatively have connected thereto a stem portion 62 of a valving member 64 provided with a valve surface 66.

Housing section 44 may also be provided with a somewhat enlarged bore 68, into which the valving end of valve member 64 generally extends as through valve guide surface 70. A valve seat 74 is formed generally in bore 68 as to effectively circumscribe passage 56. A spring 72 situated in chamber 48 resiliently urges diaphragm 46, as well as valve member 64, downwardly as to thereby urge valve surface 66 into closed condition against cooperating valve seat 74 to thereby terminate communication and flow of fuel as between bore 68 and passage or conduit portion 56. As generally shown, a plurality of passages 76 may serve to complete communication as between bore 68 and chamber 50.

Generally, in the preferred embodiment of the invention, the effective biasing force of spring 72 is of a comparatively low order of magnitude and, preferably, spring 72 is of a comparatively high rate.

The fuel bowl assembly, as typically illustrated, in simplified, is comprised of a housing or body 78 defining a chamber 80 for the containment therein of fuel as is supplied thereto through conduit means 38. The fuel bowl assembly 18 may also comprise a float member 82 provided with a float arm 84 which is pivotally secured to the housing as by pivot support member 86. Suitable fuel metering means such as calibrated restriction means generally depicted at 88 may be provided as to communicate with the fuel within chamber 80.

An inlet passage 90, formed in fuel bowl housing 78 and communicating at one end with conduit means 38, terminates in a generally enlarged bore 92 which slidably receives a needle-like fuel inlet valve 94. The valve 94 may be of the type having axially extending flattened surfaces 96 for providing space portions between the body of valve member 94 and bore 92 through which fuel may pass into chamber 80 whenever valve surface 98 is permitted to move away from the generally annular cooperating valve seat 100. As well known in the art, auxiliary fuel passage means 102 may also be provided as to communicate between bore 92 and chamber 80. A spring 104, operatively engaging float 82 continually applies a comparatively slight upward biasing force against float 82 to, in effect, augment the buoyancy of float 82. In any event, when sufficient fuel is provided to chamber 80, float 82, through its arm 84, urges valve 94 upwardly against seat 100 thereby terminating further fuel flow through conduit 90 and into chamber 80.

OPERATION OF INVENTION

During normal vehicle and engine operation, pump assembly 32 will be supplying fuel to the valve assembly 36, as via conduit means 34. In so doing, because of the communication established between chamber 48 and the intake of pump 32 by conduit means 39, chamber 48 becomes exposed to the fuel pump demand and consequently experiences a reduction in pressure therein in response to such fuel pump demands. The reduction in pressure in chamber 48 coupled with the relatively higher pump output pressure transmitted via conduit means 34 against the effective area of valving surface 66 results in a pressure differential (effectively across diaphragm 46 and closed valve surface 66) which, in turn, develops a force of sufficient magnitude to overcome the biasing force of spring 72 to thereby cause initial upward movement of valve 64 and diaphragm 46 thereby opening valve 64 and completing communication as between inlet passage 56 and chamber 50.

As pumped fuel is thusly supplied to chamber 50, the relatively higher pressure thereof is applied to the underside of diaphragm 46 while the upper side of the diaphragm 46 is still exposed to the relatively lower pressure created by the pump demand. The application of the pump pressure against the underside of diaphragm 46 is sufficient to assure valve 64 remaining open during continued normal engine and vehicle operation.

In the event that the associated vehicle should experience a high order impact, as might occur in a crash, or rolls over or actually attains or comes to rest in a physical attitude (because of a high order impact) wherein the fuel reservoir 18 is at an elevation below that of the fuel tank assembly 26, pump demand will effectively cease to exist. Consequently, the pump created pressure differential, previously referred to, across diaphragm 46 also ceases to exist and spring 72 is permitted to move valve member 64 closed against seat 74 to thereby prevent any further flow of fuel from passage 56 into chamber 50. It should also be made clear that even without a roll-over condition or a change in the altitude of the vehicle, a high order impact will cause a surge condition at the inlet of pump assembly 32 which, in turn, reduces or eliminates the relatively lower pressure otherwise produced by the pump demand thereby causing valve 64 to move to its closed condition.

Such termination of fuel flow is maintained even though the liquid static pressure head of the fuel within the fuel tank is relatively high as because of its possible elevation substantially above the valve assembly 36. This becomes evident from an inspection of FIG. 2 wherein it can be seen that any such static pressure head, once valve member 64 is closed, only serves to further apply an additional closing force against valve member 64. That is, the static pressure head will also be transmitted to chamber 48 via conduit means 30, 39 and 52 thereby adding to the force of spring 72 closing valve 64. The closing force during this condition is, of course, greater than the force tending to open valve member 64 since the opening force is determined by the relatively small effective area of valving surface 66 against which the static pressure head is applied.

In order to possibly tailor the pressure drop within chamber 48 as to have such pressure drop exhibit certain desired characteristics in relation to pump demand, it is contemplated that restriction means, such as at 108, may be provided generally upstream of the point at which communication between the inlet of pump 32 and chamber 48 is affected.

The valving assembly 36 may, of course, be situated in any suitable location on the associated vehicle. However, generally, the closer that such valve assembly 36 is located to the point or points of discharge of fuel to the engine 10, the better the overall results will be because if any fuel line effectively between the valve assembly 36 and engine 10 would have a tendency to drain, the volume of such fuel available to so drain would be minimized.

Although only a preferred embodiment of the invention has been disclosed and described, it is apparent that other embodiments and modifications of the invention are possible within the scope of the appended claims.

I claim:

1. In a vehicle having a fuel consuming engine, the combination comprising fuel tank means, fuel metering means for metering the rate of flow of said fuel to said engine, fuel pump means effective for supplying a flow of said fuel from said fuel tank means to said fuel metering means, and pressure responsive safety valving means effective for at times a preventing flow of said fuel from said fuel tank means to said fuel metering means, said valving means being situated as to be generally downstream of said fuel pump means and generally upstream of said fuel metering means and said valving means being responsive to the intake pressure of said fuel pump means as well as to the discharge pressure of said fuel pump means.

2. In a vehicle having a fuel consuming engine, the combination comprising fuel tank means, fuel metering means for metering the rate of flow of said fuel to said engine, fuel pump means effective for supplying a flow of said fuel from said fuel tank means to said fuel metering means, and pressure responsive safety valving means effective for at times preventing flow of said fuel from said fuel tank means to said fuel metering means, said safety valving means comprising housing means, said housing means having first and second chamber means, movable wall means defining at least a portion of said first chamber means and at least a portion of said second chamber means, fuel inlet means formed in said housing means effective for communicating with said first chamber means, fuel outlet means formed in said housing means for communication with said first chamber means, valve member means situated generally in said first chamber means and operatively connected to said movable wall means, biasing means normally urging said valve member means toward a closed position as to thereby terminate communication as between said inlet means and said first chamber means, said fuel pump means comprising a pump inlet and a pump discharge, said pump discharge being in communication with said fuel inlet means, and said pump inlet being in communication with said second chamber means.

3. The combination according to claim 2 and further comprising calibrated restriction means generally upstream of said fuel pump means, and wherein said second chamber means communicates with said pump inlet at a point generally downstream of said restriction means.

4. The combination according to claim 2 wherein said movable wall comprises a pressure responsive diaphragm.

5. The combination according to claim 2 wherein said biasing means comprises spring means.

6. The combination according to claim 2 wherein said movable wall means comprises pressure responsive diaphragm means wherein said biasing means comprises spring means situated generally in said second chamber means and operatively engaging said valve member means.

7. In a vehicle having a fuel consuming engine, the combination comprising fuel tank means, fuel metering means for metering the rate of flow of said fuel to said engine, fuel pump means effective for supplying a flow of said fuel from said fuel tank means to said fuel metering means, and pressure responsive safety valving means effective for at times preventing flow of said fuel from said fuel tank means to said fuel metering means, said safety valving means being situated as to be generally downstream of said fuel pump means and generally upstream of said fuel metering means, said safety valving means comprising housing means, said housing means comprising first and second chamber means, movable wall means defining at least a portion of said first chamber means and at least a portion of said second chamber means, fuel inlet means formed in said housing means effective for communicating with said first chamber means, fuel outlet means formed in said housing means for communication with said first chamber means, valve member means situated generally in said first chamber and operatively connected to said movable wall means, biasing means normally urging said valve member means toward a closed position as to thereby terminate communication as between said inlet means and said first chamber means, said fuel pump means comprising a pump inlet and a pump discharge, said pump discharge being in communication with said fuel inlet means, said pump inlet being in communication with said second chamber means, said movable wall means comprising pressure responsive diaphragm means, said biasing means comprising spring means situated generally in said second chamber means and operatively engaging said valve member means, and further comprising calibrated restriction means generally upstream of said fuel pump means, and said second chamber means communicating with said pump inlet at a point generally downstream of said restriction means.

8. A safety shut-off valve assembly, comprising housing means, said housing means comprising first and second chamber means, movable pressure responsive wall means defining at least a portion of said first chamber means and at least a portion of said second chamber means, fluid inlet means formed in said housing means effective for communicating with said first chamber means and a source of relatively high fluid pressure, fluid outlet means formed in said housing means for communicating with said first chamber means and fluid receiving means downstream of said first chamber means, valve member means situated generally within said first chamber means and operatively connected to said movable wall means, biasing means normally urging said valve member means toward a closed position as to thereby terminate communication as between said inlet means and said first chamber means, wherein said movable wall means comprises pressure responsive diaphragm means, wherein said biasing means comprises spring means situated generally within said second chamber means, and further comprising passage means formed in said housing means for communicating with said second chamber means and a source of relatively low fluid pressure.

* * * * *